Aug. 2, 1949.   G. H. PALM   2,478,052
HOSE COUPLER
Filed Oct. 3, 1945
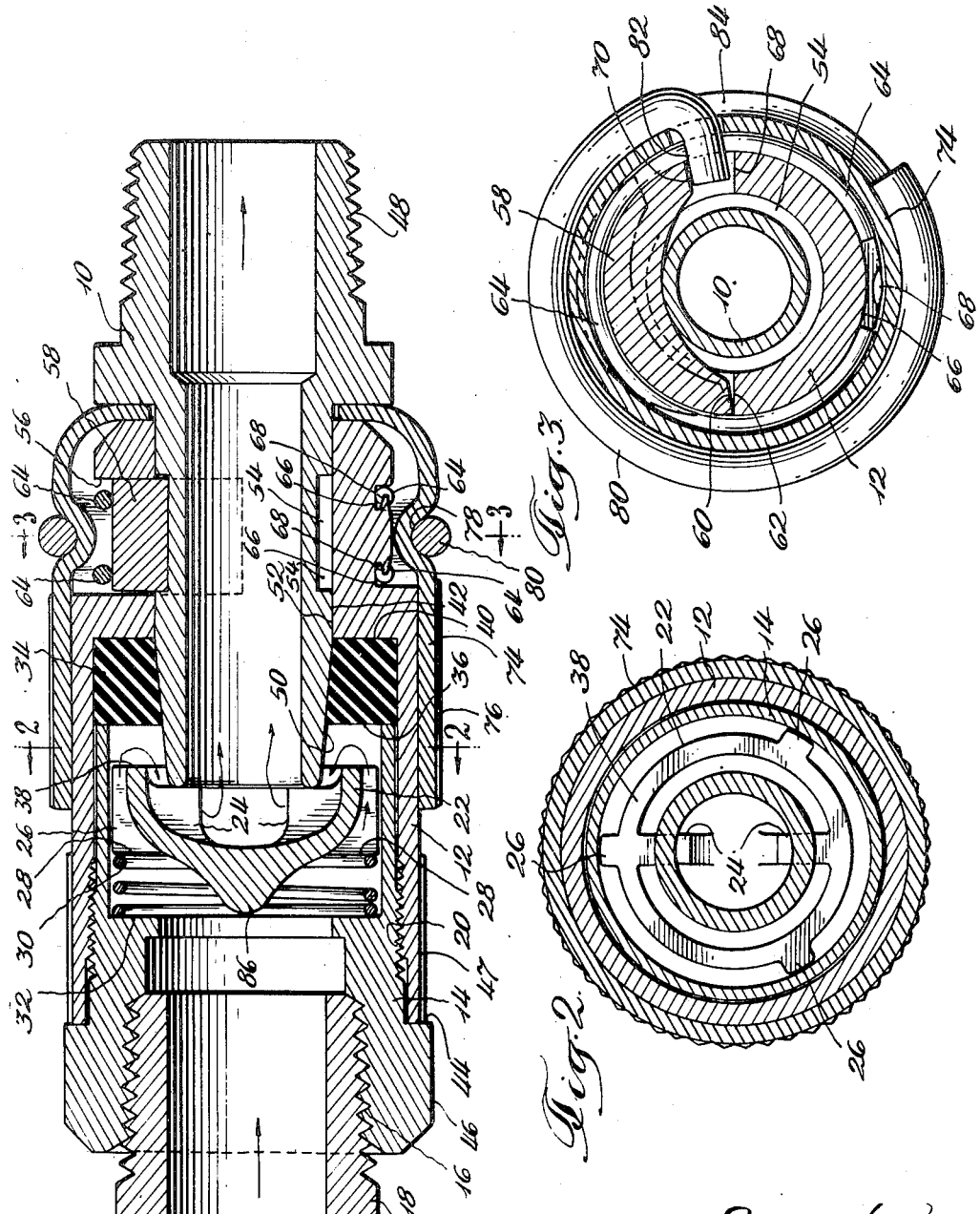
Inventor.
George H. Palm
By Williams, Bradbury & Hinkle
Attorneys.

Patented Aug. 2, 1949

2,478,052

UNITED STATES PATENT OFFICE 2,478,052

HOSE COUPLER

George H. Palm, Chicago, Ill., assignor to Stewart-Warner Corporation, Chicago, Ill., a corporation of Virginia Application October 3, 1945, Serial No. 619,978

5 Claims. (Cl. 285—173)

This invention relates to coupling devices for hose and similar flexible conduit, and one object of the invention is to provide an improved hose coupler arranged for quick connection or disconnection of the coupled sections.

Another object of the invention is to provide a hose coupler of sturdy construction having relatively few parts and designed for simple and economical manufacture and assembly.

It is also an object of the invention to provide a hose coupler having a yielding sealing member and having also a check valve in the member of the coupling which is permanently attached to the supply line, the sealing member serving as a seat for the check valve when the coupling is disconnected and serving to seal the connection when the coupling parts are operatively engaged, with the check valve open.

A further object of the invention is to provide a hose coupler including a yielding sealing member so arranged that it must be compressed when the parts of the coupling are operatively connected, and a spring latch positioned to hold the parts in connected relation with the sealing member thus compressed.

Other objects and advantages of the invention will appear from the following description taken in connection with the drawings, in which:

Fig. 1 is an axial sectional view of a hose coupling embodying this invention showing the parts in coupled relation;

Fig. 2 is a transverse section taken as indicated at line 2—2 on Fig. 1;

Fig. 3 is a transverse section taken as indicated at line 3—3 on Fig. 1.

The hose coupler which is the subject of this invention is applicable to hose lines or conduits which convey water, oil, gas, air, or other fluids, and it is designed to provide a reliably sealed joint adapted to withstand fairly high pressure when the parts are in coupled relation while including fastening means which permits the parts to be quickly separated when desired. The coupling comprises two principal parts or members which are the male member or terminal 10, and the female member or sleeve 12. The sleeve 12 is securely but detachably associated with a head or plug 14 threaded at 16 for connection with the supply pipe or hose 18 and threaded at 20 for its engagement with the sleeve 12.

The sleeve 12 houses a check valve 22 having a dome-shaped body portion with a pair of inwardly projecting radial ribs 24 adjacent the annular rim of the valve and three outwardly projecting radial ribs 26. The ribs 26 serve to center the valve and guide it slidably in the sleeve 12; and they also provide shoulders 28 for seating the spring 30 which reacts between said shoulders and a shoulder 32 formed in the plug or head 14 of the sleeve member. The valve is thus urged by the spring toward an annular sealing member 34 having a flat face 36 upon which the annular edge 38 of the dome-shaped body of the check valve seats when the valve is in closed position.

The sealing member 34 fits snugly in the sleeve 12 and is lodged in a transverse end wall or shoulder 40 formed in the sleeve around its bore 42 through which the male terminal of the coupling is inserted. The sealing member 34 is locked in position in the sleeve 12 by the engagement of the inner end of the plug member 14 with the flat face 36 of the sealing member when the plug is screwed home with the shoulder 44 of its head portion 46 abutting the end of the sleeve 12. The head 46 is of hexagonal or other polygonal form and an exposed portion of the sleeve 12 is knurled as indicated in Fig. 1, at 47.

The tubular terminal 10 is threaded at 48 for attachment to a hose section or other conduit and is formed with a tapered end portion 50 which adjoins a cylindrical portion 52 dimensioned to fit snugly in the bore 42 of the sleeve 12. The annular sealing member 34 has a central opening which is normally smaller than the bore 42 so that as the tapered portion 50 of the terminal 10 enters the member 34 it expands this opening and compresses the material of the sealing member around it; if desired, the central opening in the member 34 may be tapered with substantially the same pitch as the tapered portion 50 of the terminal so that compression of the material will be substantially uniform and its sealing effect will be distributed along the tapered surface 50 when the coupling members are connected in their final operative position.

The cylindrical portion 52 of the terminal 10 is formed with an annular groove 54 and a transverse chordal slot 56 is cut in the sleeve member 12 of substantially the same width as the groove 54 and in position to register with it when the coupling parts are connected. The latch 58 is accommodated in the slot or opening 56 in the sleeve and as shown in Fig. 3 the latch member is of crescent form with blunted ends. One end 60 of the latch member rests on the radial shoulder 62 formed in the sleeve 12 by its slot or opening 56 and the latch is movable about this contact as a fulcrum point and through a limited angle which is sufficient for engagement or disengagement of the latch member with the groove 54 of the terminal 10. Split ring springs 64, 64 embrace the latch 58 and the unslotted portion of the sleeve 12 and yieldingly urge the latch member inwardly toward the axis of the coupling for engagement in the groove 54 when the parts are connected. The ends of the springs 64 are spaced apart in grooves 66, 66, formed in the sleeve 12, and the material of the sleeve is upset into each of said grooves at 68, thus blocking the grooves so as to position the springs circumferentially therein.

When the tapered end portion 50 of the terminal 10 enters the bore 42 it cams the latch 58 open and when the groove 54 arrives in registration with the latch 58, the latter is snapped into the groove by its springs 64. At this position the tapered portion 50 of the terminal will have enlarged the opening in the sealing member 34 by forcing its way through said opening, and the annular end of the terminal will have engaged the edges of the ribs 24 in the dome-shaped body of the check valve 22, forcing the valve open and partially compressing its spring 30 as shown in Fig. 1. This provides for the flow of oil, air, or other fluid, past the outer ribs 26 of the valve 22 toward the face of the sealing member 34 and then reversely between the ribs 24 of the valve member and around the end of the tubular terminal 10 for flow through the bore thereof as indicated by arrows in Fig. 1. The pressure of the fluid thus acts against the flat face 36 of the sealing member 34 to compress it firmly against the shoulder 40 and against the cylindrical wall of the sleeve 12 and also against the tapered portion 50 of the terminal 10, insuring an adequate seal against leakage. It will be understood that the sealing member 34 may be composed of rubber, neoprene, or other resilient and yielding material which may be varied depending upon the chemical composition required in view of the particular fluid which is to be conveyed through the coupling.

To effect quick release of the latch 58 when the coupling members are to be disconnected, there is rotatably mounted on the sleeve 12 an actuator in the form of a cylindrical ferrule 74 which may have a ribbed or knurled cylindrical surface at 76 and which provides a circumferential groove 78 for lodgment of a spring ring 80. One end of the ring 80 is bent inwardly at 82 through an opening 84 in the ferrule 74 and engages the free end 70 of the latch member 58 so that a slight rotation of the ferrule 74 on the sleeve 12 swings the latch 58 about its fulcrum end 60, rocking it out of the groove 54 and releasing the terminal 10 from the sleeve 12. The member 80 is made as a spring ring for convenience of assembly, and it may be understood that any other means of providing an abutment or shoulder on the ferrule 74 extending inwardly for engagement with the end of the latch 58 would serve as an equivalent of the in-turned end 82 of the ring 80. Incidentally, this end portion 82, extending between the spring rings 64, retains the ferrule 74 in place on the sleeve 12.

In the preferred form illustrated, the dome-shaped body of the check valve 22 is smoothly rounded and stream-lined, with a tapered but rounded tip portion 86 protruding toward the pressure side or inlet end of the sleeve 12. This design of the valve aids materially in securing a smooth flow and high capacity, and that result is further insured by fitting the spring 30 just inside the cylindrical wall of the sleeve 12 where it is practically out of the path of fluid moving toward and past the valve 22; with the spring in this position the fluid does not have to pass between the coils, and moves steadily through the spaces between the three guide ribs 26. As shown, the edges of these ribs which are presented toward the flow are tapered and rounded. The rounded interior form of the dome-shaped valve body smoothly reverses the flow and directs it around the rounded edge of the terminal 10 and into the bore of the terminal.

While there is shown and described herein certain structure illustrating the invention, it is to be understood that the invention is not limited thereto or thereby but may assume numerous other forms and includes all modifications, variations and equivalents coming within the scope of the following claims.

I claim:

1. A coupling comprising a sleeve having an inlet end and an outlet end with an annular sealing member lodged in said sleeve, a tubular terminal dimensioned to enter the sleeve and to fit into said sealing member, said terminal having a circumferential groove, a chordal slot in said sleeve registering with said groove when the terminal is entered in the sealing member, a latch member seated in said slot and fulcrumed at one end upon one end of said slot for movement into and out of engagement with the groove, and a spring member embracing the sleeve and the latch and urging said latch into position to engage in the groove.

2. A coupling comprising a sleeve having an inlet end and an outlet end with a sealing member lodged in said sleeve, a terminal member dimensioned to engage in said sleeve in sealing relation therewith, said terminal member having a circumferential groove, a chordal slot in said sleeve registering with said groove when the terminal is engaged in sealing relation with said sleeve, a latch member seated in said slot and fulcrumed at one end upon one end of said slot for movement into and out of engagement with the groove, resilient means embracing the sleeve and the latch and urging said latch into position to engage in the groove, and means exterior to said sleeve having a part engaging said latch opposite the fulcrumed end thereof, said means being movable relative to said sleeve for retracting said latch.

3. A coupling comprising a sleeve having an inlet end and an outlet end with a sealing member lodged in said sleeve, a tubular terminal dimensioned to engage in said sleeve in sealing relation therewith, said terminal having a tapered end portion and a circumferential groove, a transverse slot in said sleeve adjacent the end of entry for said terminal, said slot registering with said groove when the terminal is positioned in said sleeve in sealing relation therewith, a latch member fulcrumed at one end upon one end of said slot for rocking movement into and out of engagement with the groove, and resilient means embracing the sleeve and the latch and urging said latch inwardly into engagement in said groove, said tapered end of said terminal being adapted to wedge said latch outwardly upon entry of the terminal into the sleeve to facilitate engagement of said terminal in sealing position.

4. A coupling comprising a sleeve having inlet and outlet ends and a transverse slot between said ends, a tubular terminal dimensioned to engage in said sleeve in sealing relation therewith, said terminal having a circumferential groove registering with the slot when the terminal is positioned in sealing relation with the sleeve, a spring pressed latch in said slot engageable in said groove to retain the terminal in position in the sleeve, a ferrule rotatable on the sleeve and having a circumferential groove with an opening therein, and a spring ring lodged in said groove and having an end turned inwardly to project through said opening into engagement with the latch for releasing said latch upon rotation of the ferrule.

5. A coupling member comprising a sleeve having inlet and outlet ends and a chordal slot between said end, a terminal member dimensioned to engage in said sleeve in sealing relation therewith, said terminal having a circumferential groove registering with said slot when the terminal is positioned in sealing relation with said sleeve, a spring pressed latch fulcrumed at one end upon one end of said slot for movement into and out of engagement with said groove, a ferrule rotatable upon said sleeve and having a circumferential groove with an opening therein, and a spring ring lodged in said groove having an end turned inwardly to project through said opening into engagement with the end of said latch opposite its fulcrumed end for releasing said latch upon rotation of the ferrule.

GEORGE H. PALM.

REFERENCES CITED

The following references are of record in the file of this patent:

UNITED STATES PATENTS

| Number | Name | Date |
| --- | --- | --- |
| 28,548 | Arnold | June 5, 1860 |
| 37,721 | Jucket | Feb. 17, 1863 |
| 464,386 | Patterson | Dec. 1, 1891 |
| 592,899 | Wilson | Nov. 2, 1897 |
| 2,044,252 | Mitchell | June 16, 1936 |
| 2,102,774 | Williams | Dec. 21, 1937 |
| 2,248,701 | Fowler | July 8, 1941 |

FOREIGN PATENTS

| Number | Country | Date |
| --- | --- | --- |
| 518,306 | Germany | Jan. 29, 1931 |
| 582,136 | Germany | Aug. 9, 1933 |